United States Patent
Kao et al.

(10) Patent No.: US 8,472,723 B2
(45) Date of Patent: Jun. 25, 2013

(54) IMAGE PROCESSING METHOD AND RELATED APPARATUS

(75) Inventors: Meng-Chao Kao, Taipei (TW); Kuo-Lung Tsao, Kaohsiung County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 1191 days.

(21) Appl. No.: 12/357,411

(22) Filed: Jan. 22, 2009

(65) Prior Publication Data
US 2009/0324122 A1 Dec. 31, 2009

(30) Foreign Application Priority Data
Jun. 26, 2008 (TW) .............................. 97123908 A

(51) Int. Cl.
*G06K 9/48* (2006.01)

(52) U.S. Cl.
USPC .......................................... 382/199; 382/103

(58) Field of Classification Search
USPC .......................................... 382/103, 254–275
See application file for complete search history.

(56) References Cited

U.S. PATENT DOCUMENTS

| | | | |
|---|---|---|---|
| 5,706,054 A * | 1/1998 | Hannah | 375/240.12 |
| 6,366,699 B1 * | 4/2002 | Kuwano et al. | 382/199 |
| 6,944,315 B1 * | 9/2005 | Zipperer et al. | 382/103 |
| 7,184,608 B2 | 2/2007 | Moon | |
| 2003/0081836 A1 * | 5/2003 | Averbuch et al. | 382/199 |
| 2006/0181643 A1 | 8/2006 | De Haan | |
| 2006/0251170 A1 | 11/2006 | Ali | |
| 2006/0291741 A1 * | 12/2006 | Gomi et al. | 382/266 |

FOREIGN PATENT DOCUMENTS

| | | |
|---|---|---|
| CN | 1771516 A | 5/2006 |
| CN | 1801288 A | 7/2006 |
| TW | 200717362 | 5/2007 |
| TW | 200731767 | 8/2007 |

OTHER PUBLICATIONS

Feng Peng et al., "Noise-reduction of Digital Video Image Based on Time-recursive Filtering", Journal of Chongqing University (Natural Science Edition), vol. 28, No. 2, Feb. 2005, p. 23-25.

* cited by examiner

*Primary Examiner* — Alex Liew
(74) *Attorney, Agent, or Firm* — Winston Hsu; Scott Margo

(57) ABSTRACT

The present invention discloses an image processing method. The image processing method includes: performing an edge detection upon image data to generate an image edge detection result; determining an adjusting parameter corresponding to a target pixel according to the image edge detection result; and adjusting a gray value of the target pixel according to the adjusting parameter.

12 Claims, 8 Drawing Sheets

IMAGE PROCESSING METHOD AND RELATED APPARATUS

BACKGROUND OF THE INVENTION

1. Field of the Invention

The present invention relates to an image processing method and related apparatus applied to a display, and more particularly, to an image processing method and related apparatus that can reduce motion blur in an LCD (liquid crystal display).

2. Description of the Prior Art

Due to insufficient response times of liquid crystals and a hold-type displaying method, moving objects shown in LCD displays often have blurred edges.

Principles of the response time of liquid crystal and the hold-type displaying method are well known by those skilled in this art, and therefore further descriptions are omitted here. An over-drive (OD) method is generally used for improving the response time of the liquid crystal, where the over-drive method initially provides a new driving voltage over an original driving voltage to quicken a rotation speed of liquid crystal molecules, and then returns to the original driving voltage. However, the over-drive method is ineffective when the original driving voltage is a maximum driving voltage or a minimum driving voltage. In addition, for the hold-type displaying issue, a black frame insertion method, a gray frame insertion method and motion compensation method are used for improving the hold-type displaying issue. However, the above methods suffer from demerits such as brightness degradation and flicker and require large amounts of computation. As a result, there is still no optimal method for reducing motion blur.

SUMMARY OF THE INVENTION

It is therefore an objective of the present invention to provide an image processing method and related apparatus to solve the above-mentioned problems.

According to one embodiment of the present invention, an image processing method includes: performing an edge detection upon image data to generate an image edge detection result; determining an adjusting parameter corresponding to a target pixel according to the image edge detection result; and adjusting a gray value of the target pixel according to the adjusting parameter.

According to another embodiment of the present invention, an image processing apparatus includes an edge detection unit, an adjusting parameter calculation unit and a computation unit. The edge detection unit is utilized for performing an edge detection upon image data to generate an image edge detection result. The adjusting parameter calculation unit is coupled to the edge detection unit, and is utilized for determining an adjusting parameter corresponding to a target pixel according to the image edge detection result. The computation unit is coupled to the adjusting parameter calculation unit, and is utilized for adjusting a gray value of the target pixel according to the adjusting parameter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
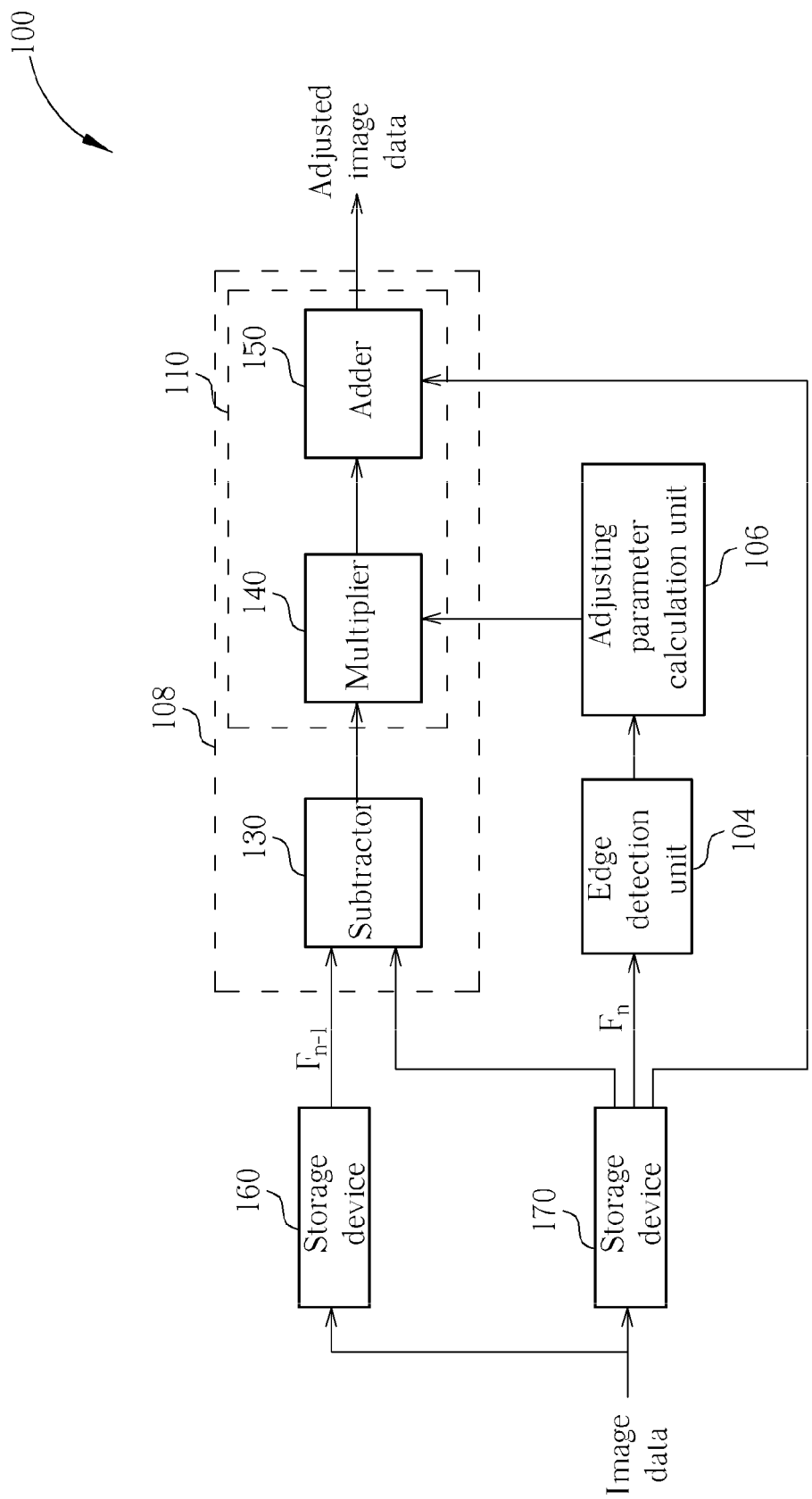
FIG. 1 is a diagram illustrating an image processing apparatus according to one embodiment of the present invention.

Please refer to FIG. 1. FIG. 1 is a diagram illustrating an image processing apparatus 100 according to one embodiment of the present invention. In this embodiment, the image processing apparatus 100 includes an edge detection unit 104, an adjusting parameter calculation unit 106, a computation unit 108 and storage devices 160 and 170. As shown in FIG. 1, the computation unit 108 includes a subtractor 130 and a computation circuit 110, and the computation circuit 110 includes a multiplier 140 and an adder 150. In addition, the storage device 160 is used to store pixel values $F_{n-1}$ in a previous frame, and the storage device 170 is used to store pixel values $F_n$ in a current frame.

Figure 2:
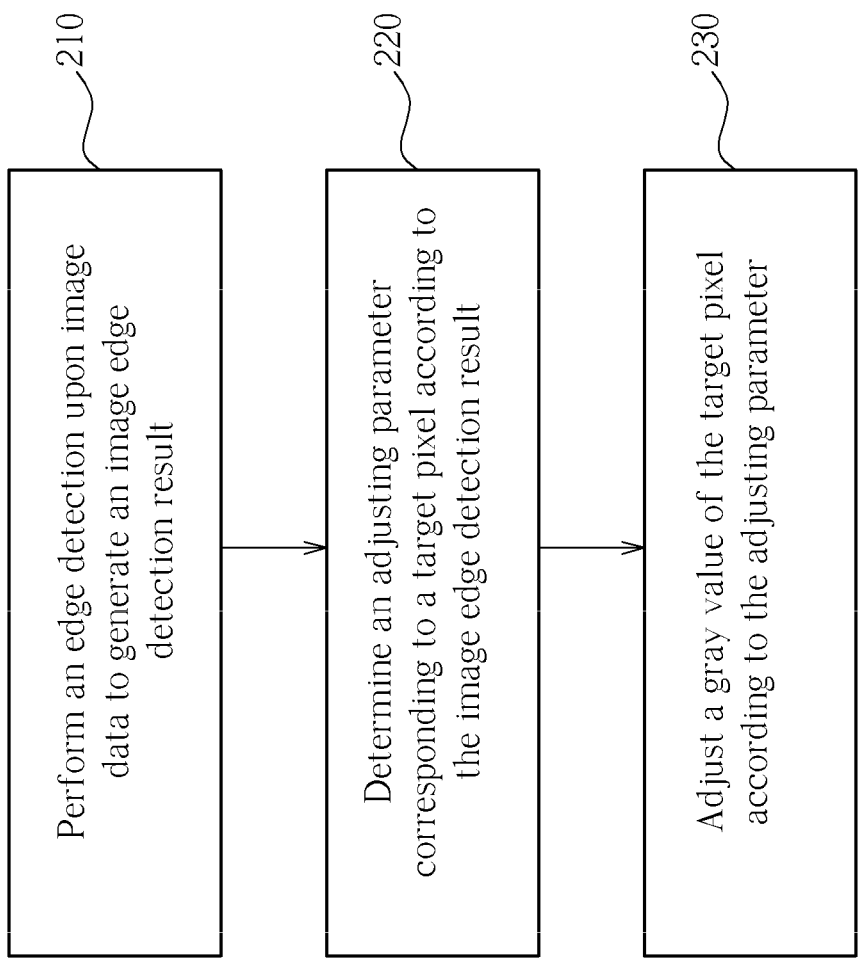
FIG. 2 is a flowchart of an image processing method according to one embodiment of the present invention.

Please refer to FIG. 1 and FIG. 2 together. FIG. 2 is a flowchart of an image processing method according to one embodiment of the present invention. Referring to the flowchart, the detailed operations of the image processing apparatus 100 shown in FIG. 1 are described as follows.

Figure 3:
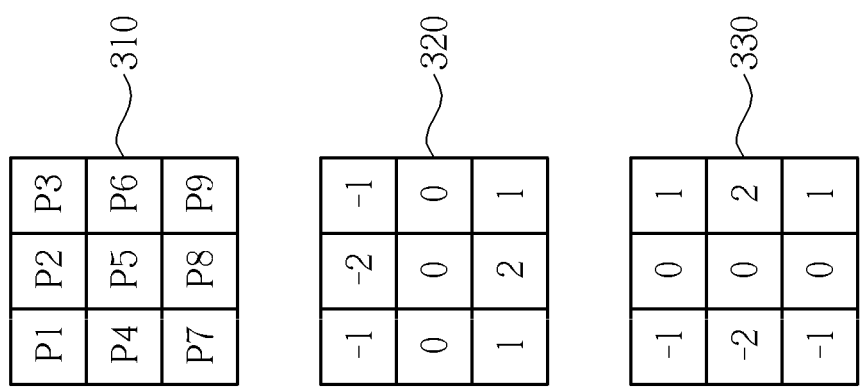
FIG. 3 is a diagram illustrating a Sobel mask applied in the embodiment of the present invention.

In Step 210, the edge detection unit 104 performs the edge detection upon the image data, and in this embodiment, the edge detection unit 104 uses a derivative filter corresponding to a spatial mask to perform the edge detection on the image data to generate the image edge detection unit. In addition, there are several methods capable of performing the edge detection, in this embodiment, a Sobel mask (also called a Sobel filter) is used to perform the edge detection. Please refer to FIG. 3. FIG. 3 is a diagram illustrating the Sobel mask applied in the embodiment of the present invention. As shown in FIG. 3, each cell in a 3*3 square 310 corresponds to a pixel in an image, and values of the cells in the 3*3 square 310 are gray values of the corresponding pixels. In this embodiment, the above-mentioned image data performed edge detection is in the current frame. Regarding the calculations of the edge detection, first, the value of each cell in the 3*3 square 310 is multiplied by a value of a corresponding cell in Sobel operators 320 and 330. Then, the calculated values of the 3*3 square 310 and the Sobel operator 320, and the calculated values of the 3*3 square 310 and the Sobel operator 330 are respectively summed up to generate two transient values. Finally, an edge detection result of the middle cell P5 is determined by summing up absolute values of the two transient values. The above calculations can be represented as follows:

$$\text{Edge detection result of } P5 = |(P7+2*P8+P9)-(P1-2*P2+P3)|+|(P3+2*P6+P9)-(P1+2*P4+P7)|$$

At this point, the operations of a pixel are completed. After that, each pixel in the current frame undergoes the above-mentioned operations to obtain an adjusted pixel value, and the image edge detection result is obtained when all the gray values of the pixels in the current frame are adjusted.

It is noted that the Sobel mask shown in FIG. 3 and the derivative filter are for illustrative purposes only, In other embodiments of the present invention, the derivative filter can be replaced by a sharpening filter, and a Roberts mask or Prewitt mask can also be used to obtain the image edge detection result.

The image edge detection result generated in Step 210 can serve as an edge detection image, and the gray values of the pixels in the edge detection image are between 0-255. Because the image processing apparatus 100 performs the same operations on all the pixels, operations of only one pixel are described in the following description, and the pixel is named as a target pixel. In Step 220, the adjusting parameter calculation unit 106 normalizes the gray value of the target pixel of the image edge detection result to be between 0-2 in order to generate an intensity parameter K corresponding to the target pixel. In addition, a look-up table or linear reduction can be used as a normalization method. It is noted that the above-mentioned normalization method and the normalized range are for illustrative purposes only, and not limitations of the present invention.

In Step 230, the computation unit 108 generates an output gray value $F_n'$ according to the intensity parameter K in Step 220 and a gray value difference $(F_n - F_{n-1})$ between a gray value $F_n$ of the target pixel in the current frame and a gray value $F_{n-1}$ of the target pixel in the previous frame. The calculation is described below:

$$F_n' = (F_n - F_{n-1}) * K + F_n$$

The edges of the moving objects in the image can be sharpened by replacing $F_n$ by $F_n'$, and the blurred edges can thereby be improved. However, in order to prevent adjustment of pixel values of a static image, the gray value $F_n$ and $F_{n-1}$ are original pixel values of the image (that is, unadjusted pixel values). All the pixel values in the image undergo the above-mentioned operations in Steps 210-230 to generate an adjusted image, and motion blur can be reduced by this gray value adjusting mechanism.

Figure 4:
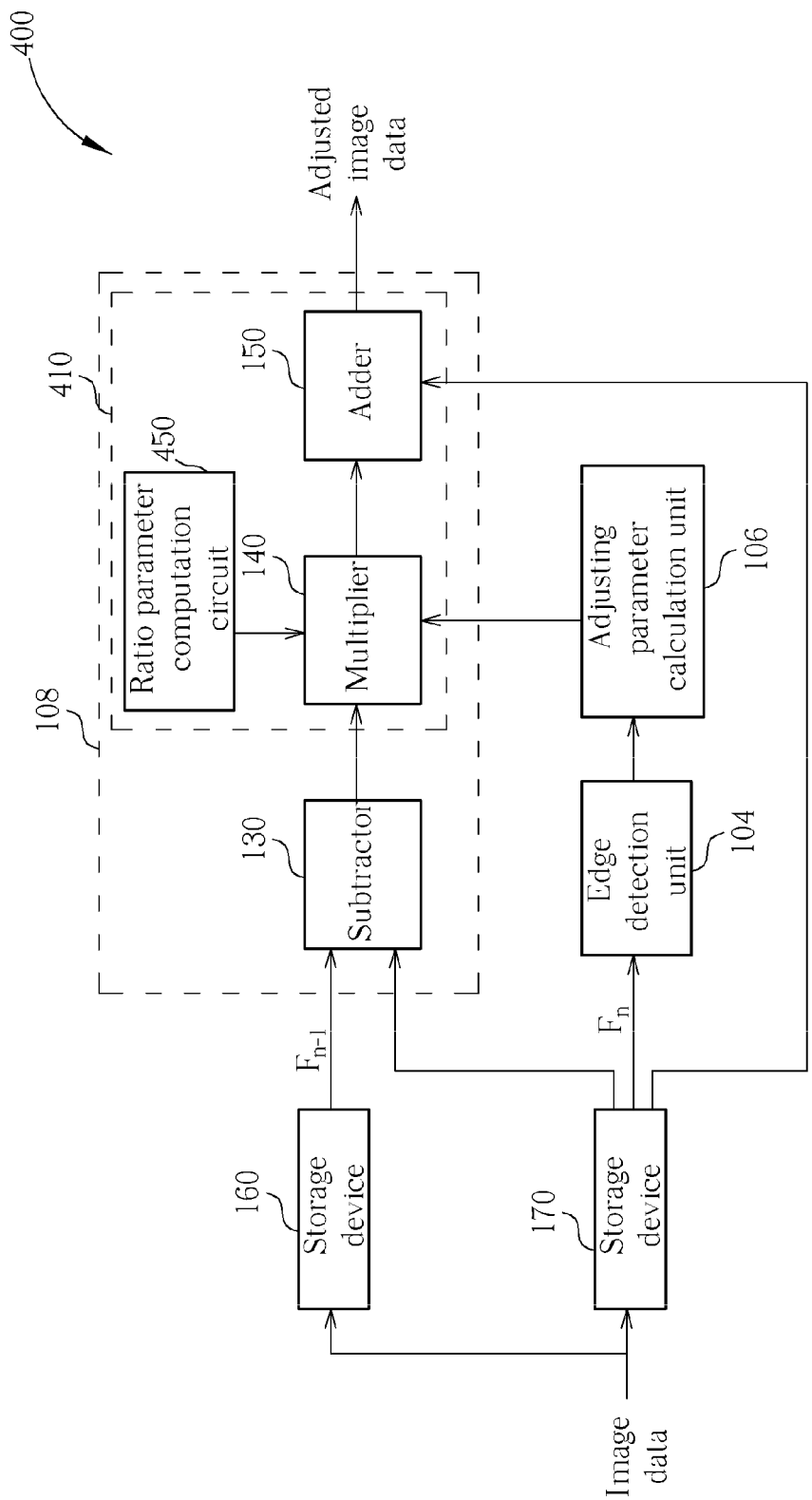
FIG. 4 is a diagram illustrating an image processing apparatus according to another embodiment of the present invention.

Please refer to FIG. 4. FIG. 4 is a diagram illustrating an image processing apparatus 400 according to another embodiment of the present invention. In this embodiment, the image processing apparatus includes the edge detection unit 104, the adjusting parameter calculation unit 106, the computation unit 108 and storage devices 160 and 170. As shown in FIG. 4, the computation unit 108 includes a subtractor 130 and a computation circuit 410, and the computation circuit 410 includes a multiplier 140 and a ratio parameter computation circuit 450. In addition, the storage device 160 is used to store pixel values $F_{n-1}$ in a previous frame, and the storage device 170 is used to store pixel values $F_n$ in a current frame.

Figure 5:
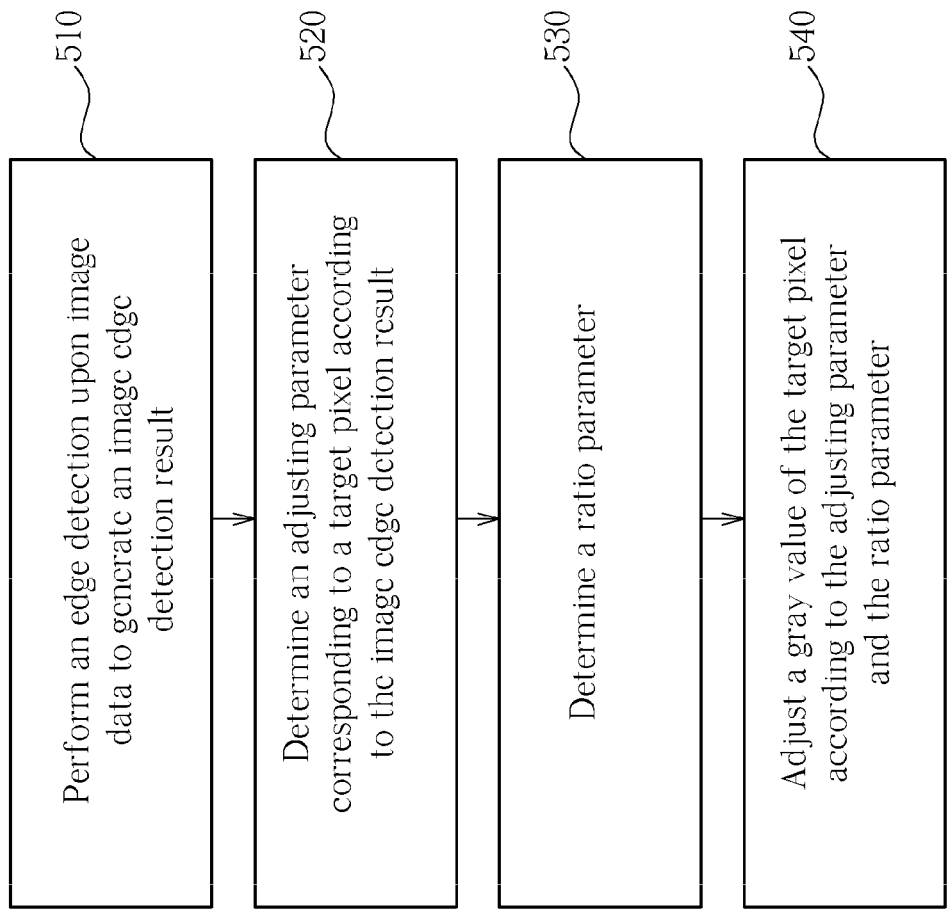
FIG. 5 is a flowchart of an image processing unit according to the embodiment shown in FIG. 4.

Please refer to FIG. 5. FIG. 5 is a flowchart of an image processing unit according to the embodiment shown in FIG. 4. As shown in FIG. 5, in Step 510 (the same as Step 210), the edge detection unit 104 uses the derivative filter corresponding to the spatial mask to perform the edge detection on the image data to generate the image edge detection unit. In addition, because all the pixels undergo the same operations, operations of only one pixel are described in the following description, and the pixel is named as a target pixel. Then, in Step 520 (the same as Step 220), the adjusting parameter calculation unit 106 normalizes the gray value of the target pixel of the image edge detection result to be between 0-2 to generate an intensity parameter K corresponding to the target pixel.

Compared with the embodiment shown in FIG. 1 and FIG. 2, in Step 530, considering the different sensitivity of the human eye when the same amount of gray level variation occurs at the lower/higher gray level, a ratio parameter S is determined according to the gray value $F_n$ of the target pixel in the current frame and a gray value $F_{n-1}$ of the target pixel in the previous frame to slightly adjust an adjusting amount of the gray value $F_n$ of the target pixel in the current frame.

Figure 6:
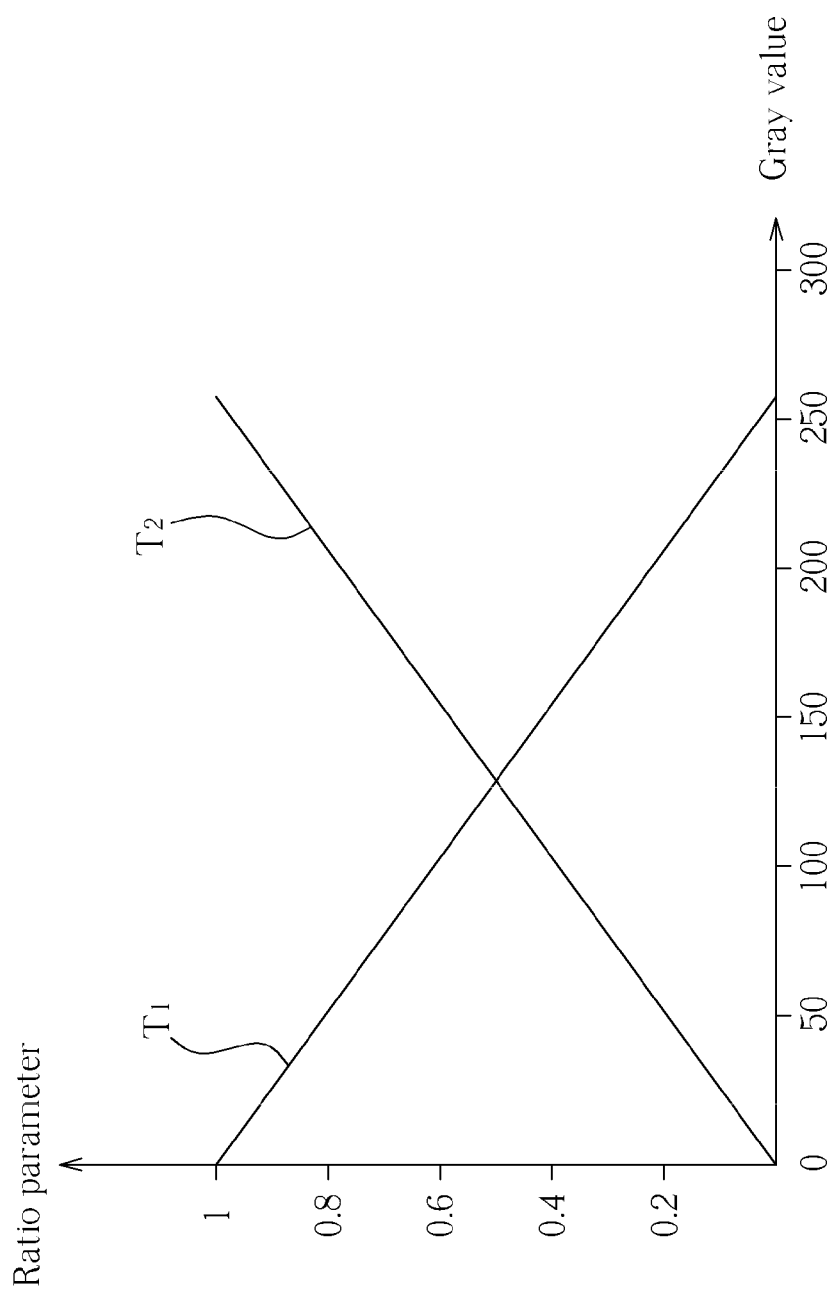
FIG. 6 is a diagram illustrating the ratio parameter characteristic line.

In addition, the ratio parameter S can be determined according to a ratio parameter characteristic line or a Gamma-type ratio parameter characteristic curve. FIG. 6 is a diagram illustrating the ratio parameter characteristic line. In the ratio parameter characteristic line, a linear relationship exists between the ratio parameter S and the gray value $F_{n-1}$ in the previous frame. As shown in FIG. 6, the ratio parameter characteristic line can be a rising ratio parameter characteristic line T1 or a falling ratio parameter characteristic line T2, where the rising ratio parameter characteristic line T1 is applied when $F_n > F_{n-1}$, and the falling ratio parameter characteristic line T2 is applied when $F_n < F_{n-1}$. In addition, applying the rising ratio parameter characteristic line T1 is to prevent the gray value $F_n$ from being adjusted to exceed a maximum gray value, and applying the falling ratio parameter characteristic line T2 is to prevent the gray value $F_n$ from being adjusted to exceed a minimum gray value.

Figure 7:
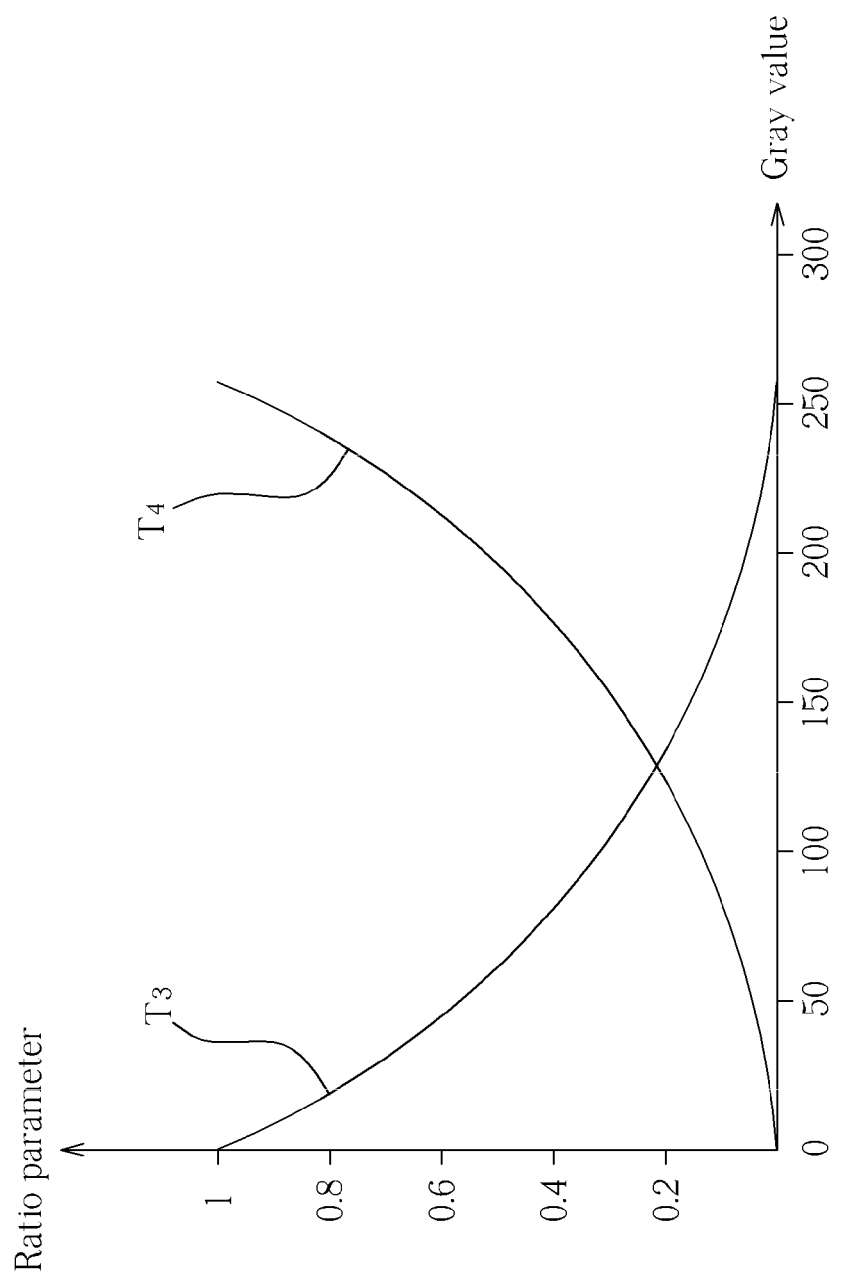
FIG. 7 is a diagram illustrating the Gamma-type ratio parameter characteristic curve.
Figure 8:
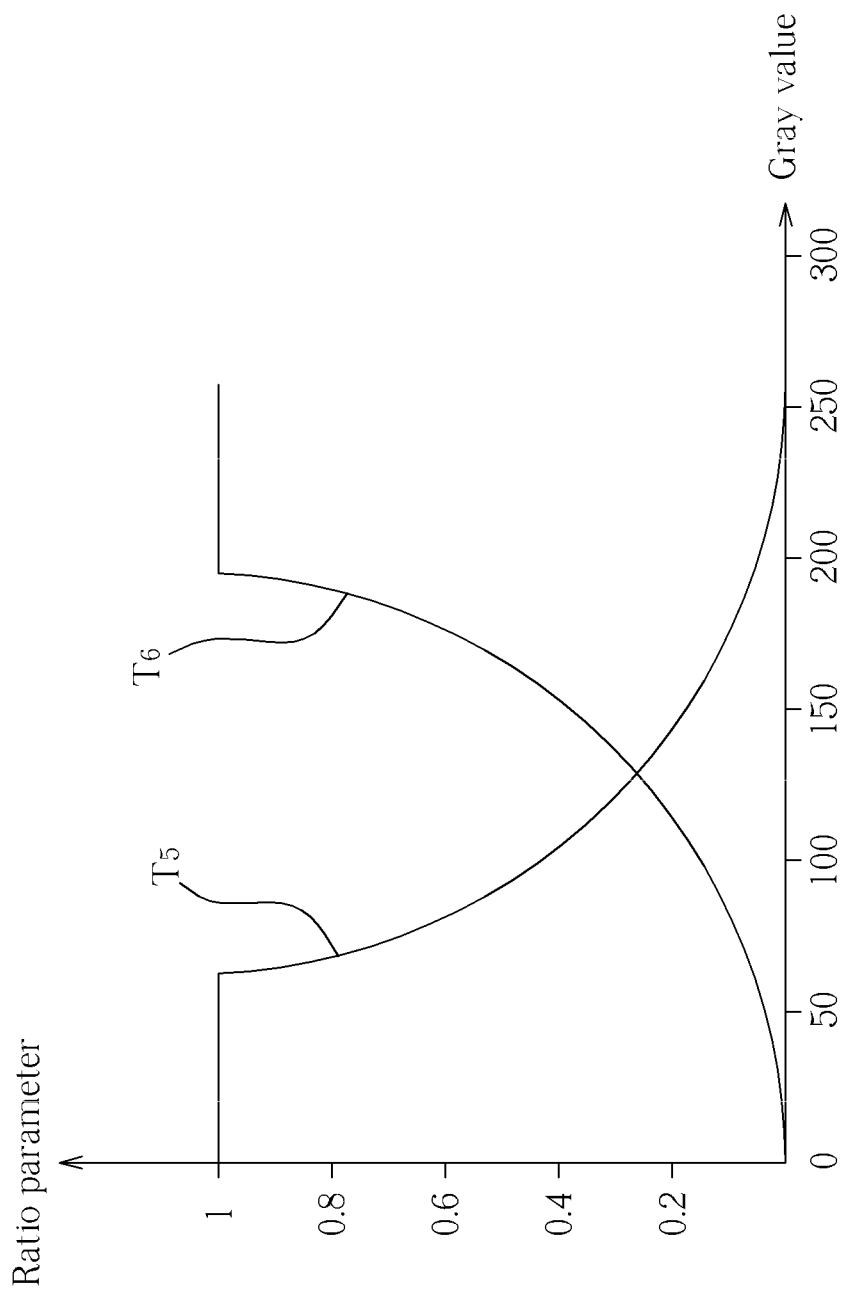
FIG. 8 is a diagram illustrating an adjusted Gamma-type ratio parameter characteristic curve.

FIG. 7 is a diagram illustrating the Gamma-type ratio parameter characteristic curve. In the Gamma-type ratio parameter characteristic curve, an exponential relationship exists between the ratio parameter S and the gray value $F_{n-1}$ in the previous frame. As shown in FIG. 7, the Gamma-type ratio parameter characteristic curve can be a rising ratio parameter characteristic curve T3 or a falling ratio parameter characteristic curve T4, where the rising ratio parameter characteristic curve T3 is applied when $F_n > F_{n-1}$, and the falling ratio parameter characteristic curve T4 is applied when $F_n < F_{n-1}$. However, considering some ratio parameters in the Gamma-type ratio parameter characteristic curve shown in FIG. 7 are too low to appropriately adjust the adjusting amount of the gray value $F_n$, an adjusted Gamma-type ratio parameter characteristic curve shown in FIG. 8 is applied to determine the ratio parameter S.

It is noted that, in the above embodiments, the ratio parameter S is determined according to the gray value $F_{n-1}$ in the previous frame. However, in other embodiments of the present invention, the ratio parameter S can also be determined according to the gray value $F_n$ in the current frame, or according to the gray value difference $(F_n - F_{n-1})$ between the gray value $F_n$ in the current frame and the gray value $F_{n-1}$ in the previous frame. These alternative designs are all within the scope of the present invention.

In Step 540, the computation unit 108 generates an output gray value $F_n'$ according to the intensity parameter K in Step 520, the ratio parameter S in Step 530, and the gray value difference $(F_n - F_{n-1})$ between the gray value $F_n$ of the target pixel in the current frame and the gray value $F_{n-1}$ of the target pixel in the previous frame. The calculation is described below:

$$F_n' = (F_n - F_{n-1}) * K * S + F_n$$

It is noted that, in the above formula, the gray value $F_n$ and $F_{n-1}$ are original pixel values of the image (that is, unadjusted pixel values). All the pixel values in the image undergo the above-mentioned operations in Steps 510-530 to generate adjusted image, and motion blur can be reduced by this gray value adjusting mechanism.

Those skilled in the art will readily observe that numerous modifications and alterations of the device and method may be made while retaining the teachings of the invention.

What is claimed is:

1. An image processing method, comprising:
    performing an edge detection upon image data of a current frame to generate an image edge detection result;
    determining an adjusting parameter corresponding to a target pixel according to the image edge detection result;
    calculating a gray value difference between a gray value of the target pixel in the current frame and a gray value of the target pixel in a previous frame; and
    adjusting the gray value of the target pixel in the current frame according to the adjusting parameter and the gray value difference, wherein
        calculating a product of the adjusting parameter and the gray value difference;
        determining a ratio parameter;
        multiplying the product by the ratio parameter to generate an adjusted product; and
        summing up the adjusted product and the gray value of the target pixel in the current frame to generate an adjusted gray value of the target pixel in the current frame.

2. The image processing method of claim 1, wherein the step of generating the image edge detection result comprises:
    utilizing a derivative filter corresponding to a spatial mask to perform the edge detection on the image data to generate the image edge detection result.

3. The image processing method of claim 1, wherein the step of determining the adjusting parameter corresponding to the target pixel comprises:
    determining the adjusting parameter according to a gray value of the target pixel of the image edge detection result.

4. The image processing method of claim 3, wherein the step of determining the adjusting parameter corresponding to the target pixel further comprises:
    determining the adjusting parameter by normalizing the gray value of the target pixel of the image edge detection result.

5. The image processing method of claim 1, wherein the step of determining the ratio parameter comprises:
    determining the ratio parameter according to at least one of the gray value of the target pixel in the current frame and the gray value of the target pixel in the previous frame.

6. An image processing apparatus, comprising:
    an edge detection unit, for performing an edge detection upon image data of a current frame to generate an image edge detection result;
    an adjusting parameter calculation unit, coupled to the edge detection unit, for determining an adjusting parameter corresponding to a target pixel according to the image edge detection result;
    a subtractor, for calculating a gray value difference between a gray value of the target pixel in the current frame and a gray value of the target pixel in a previous frame; and
    a computation unit, coupled to the adjusting parameter calculation unit, for adjusting the gray value of the target pixel in the current frame according to the adjusting parameter and the gray value difference, wherein
        a ratio parameter computation circuit, for determining a ratio parameter;
        a multiplier, coupled to the ratio parameter computation circuit, for calculating a product of the adjusting parameter and the gray value difference, and multiplying the product by the ratio parameter to generate an adjusted product; and
        an adder, coupled to the multiplier, for summing up the adjusted product and the gray value of the target pixel in the current frame to generate an adjusted gray value of the target pixel in the current frame.

7. The image processing apparatus of claim 6, wherein the edge detection unit is a derivative filter corresponding to a spatial mask, and the derivative filter is utilized for performing the edge detection on the image data to generate the image edge detection result.

8. The image processing apparatus of claim 6, wherein the adjusting parameter calculation unit determines the adjusting parameter according to a gray value of the target pixel of the image edge detection result.

9. The image processing apparatus of claim 8, wherein the adjusting parameter calculation unit determines the adjusting parameter by normalizing the gray value of the target pixel of the image edge detection result.

10. The image processing apparatus of claim 6, wherein the ratio parameter computation circuit determines the ratio parameter according to at least one of the gray value of the target pixel in the current frame and the gray value of the target pixel in the previous frame.

11. The image processing method of claim 1, wherein the gray value of the target pixel in the current frame is an original pixel value of the target pixel in the current frame, and the gray value of the target pixel in the previous frame is an original pixel value of the target pixel in the previous frame.

12. The image processing apparatus of claim 6, wherein the gray value of the target pixel in the current frame is an original pixel value of the target pixel in the current frame, and the gray value of the target pixel in the previous frame is an original pixel value of the target pixel in the previous frame.

* * * * *